United States Patent [19]
Mleinek et al.

[11] Patent Number: 5,859,425
[45] Date of Patent: Jan. 12, 1999

[54] ENCODER HAVING FIRST AND SECOND HOUSING PORTIONS AND GUIDE MEANS

[75] Inventors: Klaus Mleinek, Seebach; Jürgen Kieselbach, Schmerbach, both of Germany

[73] Assignee: Ruhlatec Industrieprodukte GmbH, Seebach, Germany

[21] Appl. No.: 732,677

[22] Filed: Oct. 15, 1996

[30] Foreign Application Priority Data

Oct. 11, 1996 [DE] Germany .................... 196 41 929.8

[51] Int. Cl.⁶ .................................................. G01D 5/34
[52] U.S. Cl. ...................................... 200/231.13; 250/239
[58] Field of Search ................... 250/239, 231.13, 250/231.14, 231.15, 231.16, 231.17, 231.18; 33/706, 707; 310/67 R, 89, 90; 403/23, 24, 337, 405.1

[56] References Cited

U.S. PATENT DOCUMENTS

| | | |
|---|---|---|
| 4,034,612 | 7/1977 | Buckwitz . |
| 4,338,517 | 7/1982 | Perrine ................... 250/231.13 |
| 4,753,112 | 6/1988 | Wetterhorn et al. . |
| 4,794,250 | 12/1988 | Togami .................. 250/231.13 |
| 4,888,481 | 12/1989 | Kallin et al. ........... 250/231.13 |
| 4,933,636 | 6/1990 | McGee .................. 250/231.13 |
| 4,942,295 | 7/1990 | Brunner et al. ........ 250/231.13 |
| 5,057,684 | 10/1991 | Service ................... 250/231.13 |
| 5,150,103 | 9/1992 | Janssen-Weels ........ 250/231.13 |
| 5,155,401 | 10/1992 | Kanaya et al. ............... 310/89 |
| 5,407,294 | 4/1995 | Giannini ................... 403/337 |
| 5,698,849 | 12/1997 | Figueria, Jr. .......... 250/231.14 |
| 5,708,496 | 1/1998 | Barnett et al. .......... 250/231.13 |

FOREIGN PATENT DOCUMENTS 3232 258 A1 11/1983 Germany .
63-228024 9/1988 Japan .

OTHER PUBLICATIONS

IBM's Technical Disclosure Bulletin vol. 30, No. 3, Aug. 1987, pp. 968–971.
"Quick Assembly Two and Three Channel Optical Encoders", pp. 1–61 to 1–72, Hewlett Packard, (no date provided).

*Primary Examiner*—Edward P. Westin
*Assistant Examiner*—John R. Lee
*Attorney, Agent, or Firm*—Darby & Darby

[57] ABSTRACT

An encoder includes a casing having an open end and a base which fits in the open end. Trapezoidal cutouts in the casing are arranged to receive partly trapezoidal projections on the base. The casing contains an optical sensor, a circuit board for operation of the sensor, and a timing disc mounted on a rotary hub. The hub has a passage for a drive shaft of a motor, and the passage is in register with an opening in the base. During assembly, the drive shaft is passed through the opening in the base and the motor and casing are urged towards one another to push the base into the casing. When the base enters the casing, the projections are received in the cutouts and a guide surface in the casing engages a centering surface on the hub. Once the projections are in the cutouts, the casing and the base are rotated relative to each other to secure the base to the casing. Due to the trapezoidal shape of the cutouts and the partly trapezoidal shape of the projections, the casing moves in a direction away from the base during rotation. This causes the guide surface of the casing to disengage from the centering surface of the hub.

16 Claims, 3 Drawing Sheets

ENCODER HAVING FIRST AND SECOND HOUSING PORTIONS AND GUIDE MEANS

BACKGROUND OF THE INVENTION

The invention relates to an encoder which is connected to a motor and is equipped with a reflecting sensor, a timing disc and a circuit board. The circuit board contains all of the components, such as resistors and contact strips, necessary for operation of the sensor.

The reflecting sensor is disposed in a housing together with the timing disc which is to be adjusted on the motor shaft so as to be in axial alignment therewith. The housing is attached to the by a flange at the output side of the motor shaft.

A known design of the encoder is described on pages 1 to 70—of the HP handbook. Here, a base plate is screwed to the flange plane of the motor and the timing disc then precisely aligned on the shaft via an adjusting device. The housing is pressed onto the base plate from above and secured by a rocking cam.

The timing disc is mounted in the housing and a locking mechanism of large diameter is used. For operation of the locking mechanism, the known encoder must be accessible from the upper side of the housing so that the housing cover needs to be large. Therefore, the sensor must be arranged relatively far from the middle of the timing disc.

With this type of housing design, the width and height of the housing are significantly larger than required by the individual elements. It has also been found that substantial time, as well as special tools, are required for assembly and adjustment. Furthermore, under unfavorable circumstances, readjustment is necessary.

SUMMARY OF THE INVENTION

It is accordingly an object of the present invention to eliminate these drawbacks by a simple design of the mini-encoder which takes manufacturing into account. The dimensions of the mini-encoder are to be reduced by about 50% relative to the existing model.

The new mini-encoder consists of two separate assemblies. The reflecting sensor, together with the timing disc, is preliminarily confined in the housing via a retaining ring. The base plate is formed with adjusting and fixing elements.

The encoder can be seen in detail in the accompanying drawings.

DESCRIPTION OF THE PREFERRED EMBODIMENTS

Figure 1:
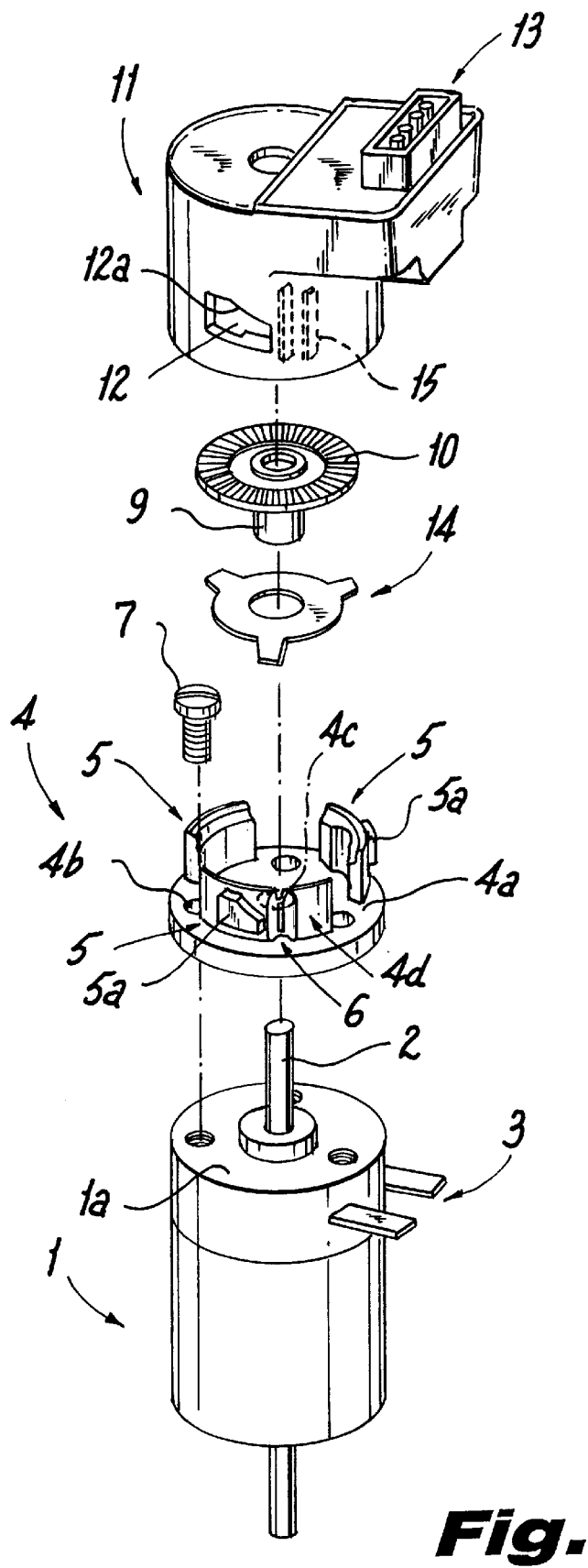
FIG. 1 is an exploded view of an encoder according to the invention.

In FIG. 1, a motor 1 is illustrated in vertical orientation and has an upwardly projecting motor shaft 2 and laterally extending terminals 3.

Above the motor shaft 2 is a circular base plate or housing portion 4 which, is screwed onto the upper side of the motor 1. The upper side of the motor 1 is designed as a flange plane.

Bayonet segments or coupling elements 5 constituting projections are fixed on the base plate 4 in the form of a ring.

The bayonet segments are symmetrically distributed along the perimeter of the flange plane 4a and are curved circumferentially of the base plate 4. Moreover, the base plate 4 contains fastening bores 4b for screws 7, a central bore 4c and guide surfaces 4d which are distributed over the periphery of the base plate and are located at the outer surfaces of the bayonet segments 5.

When the base plate 4 is attached to the front side 1a of the motor, the motor shaft 2 is passed through the central bore 4c and the motor secured by screws. The motor shaft 2 preferably has a chamfer or curvature at its tip so that the motor shaft 2 can be easily introduced into the bore of the hub 9 of a timing disc holder.

Figure 2:
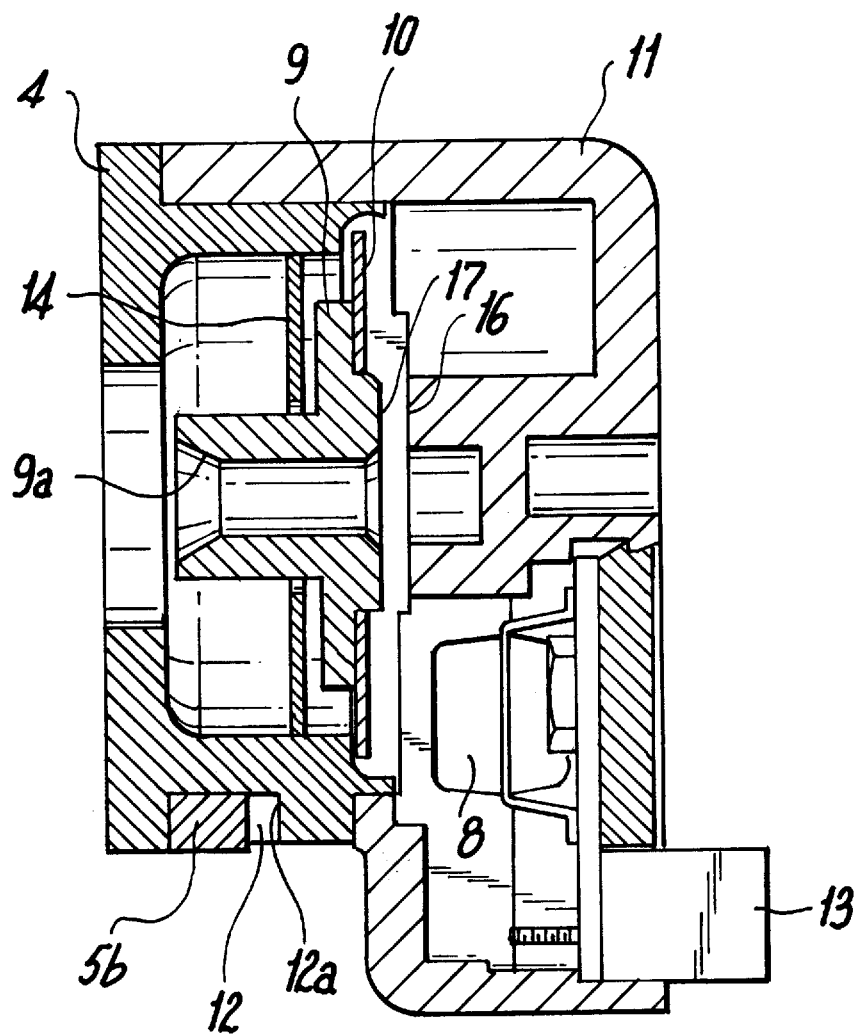
FIG. 2 shows the encoder in cross section.

The preliminarily assembled housing with all installed components is illustrated in FIG. 2 and includes a circular housing portion 11 in addition to the base plate 4. A timing disc 10 is held on the hub 9 and is prevented from falling out of the housing portion 11 by a retaining ring 14. The retaining ring 14 has radial extension, shown in FIG. 1, which engage the housing portion 11, and a central opening which receives the hub 9 with clearance. In this manner, it is possible to transport the preliminarily assembled housing without problems and without a special holder for transport. A centering surface or bearing 17 is formed on a raised rim or protusion at the upper end of the hub 9. This centering surface 17 is intended to achieve automatic centering in conjunction with an annular guide or bearing surface 16 of the housing portion 11. In addition, a countersunk surface can be disposed at the end of the hub 9, e.g., in the form of a conical depression or entry bore 9a.

An the optical sensor 8 is disposed in the housing portion 11. Electrical terminals 13 in the form of a plug are located at the upper side of the housing portion 11. A circuit board 8a forms the connections for the optical sensor and a LED.

Laterally of the housing portion 11 are slots or coupling elements 12 in which the bayonet segments 5 of the base plate 4 can be engaged. The slots 12 are longer than the bayonet segments 5. The slots 12 which curve circumferentially of the housing portion 11 are trapezoidal and have inclined upper surfaces 12a which correspond to inclined surfaces 5a of the bayonet segments. Each of the bayonet segment 5 includes a trapezoidal section and another section of constant area.

The operation of the slots and the design of the bayonet segments can be seen more clearly from FIGS. 2–3a and 3b. It is to be noted that, in FIG. 3b, the base plate 4 with the projections 5b is locked to the housing portion 11. The projections 5b belong to the bayonet segments. The vertical guide surfaces 4d of the base plate 4 contact the inner wall 11a of the housing portion 11 so that a horizontal centering of the two halves of the housing is achieved.

As can be observed from FIGS. 1 and 2, the outer walls of the housing portion 11, base plate 4 and motor 1 are in alignment. The timing disc holder in the form of the hub 9 is situated in the interior of the housing portion 11 together with the timing disc 10 which can, for example, be fixed to the timing disc holder by adhesion.

The timing disc holder, and thus the timing disc 10, is prevented from unintentionally falling out of the housing portion 11 by the retaining ring 14. At the same time, the retaining ring 14 provides adequate play for centering of the timing disc 10 on the motor shaft.

The end of the timing disc holder facing the motor is provided with the entry bore or positioning section 9a which enables the vertical axes of the shaft and timing disc to be brought into line. After the shaft 2 is pushed into the timing disc holder, both centering and a rigid connection are obtained, e.g., by pressing. This is advantageously achieved in that the hub, which has a reduced diameter, is slit so that a press fit between the hub and the motor shaft is produced even with small pressing forces.

Pressure is exerted on the housing portion 11 in the direction of the motor shaft. The bearing surface 16 of the housing portion 11, which constitutes part of a bearing section of the housing portion 11 comes to rest on the surface 17 of the hub 9 and brings the hub 9, as well as the timing disc connected therewith into the proper position for a central placement in the housing portion 11.

Figure 3A:
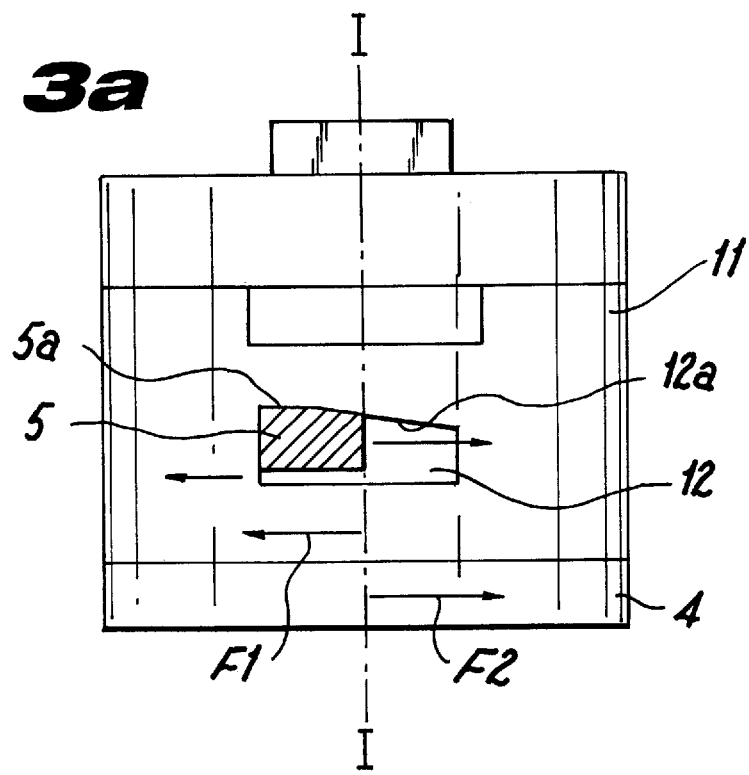
FIGS. 3a and 3b are side views showing the operation of bayonet segments for connecting two housing portions constituting part of the encoder.
Figure 3B:
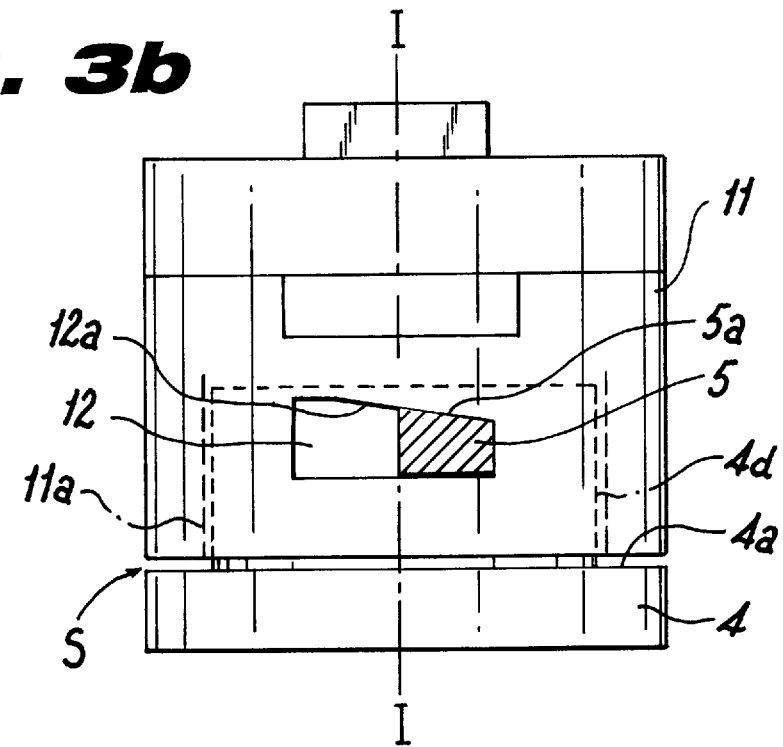

The housing portion 11 then is rotated clockwise as seen from the side of the terminals in FIG. 1. The housing portion 11 is thereby lifted, as illustrated in FIG. 3a, by the inclined surfaces 5a of the bayonet segments 5 and the inclined surfaces 12a of the housing 11. The resulting gap S causes the surface 17 of the hub to be released. Simultaneously, the housing portion 11 is fixed to the base plate 4 by sawtooth-shaped grid marks 15 distributed about the periphery of the housing portion 11 and complementary embossings 6 by cooperating sawtooth protrusions and depression.

Two simple motions of the housing portion 11 are required for assembly and can be carried out without special or auxiliary tools and, if necessary, by an automatic mechanism:

1. Pressing against the base plate

Here, a thrust collar 16 is pressed against the centering surface 17 of the hub 9 thereby capturing the shaft 2 (see above).

2. Rotation about the vertical axis I/I of FIGS. 3a, 3b

By rotating the housing portion 11 or rotating the base plate 4 in the opposite direction (arrows F1,F2), a vertical force component is produced on the inclined surfaces 5a of the bayonet segments 5. Consequently, the housing portion 11 is moved away from the base plate 4 thereby assuring adequate play S for the timing disc 10. This rotation accordingly achieves "release" of the timing disc and by engagement of the bayonet segments 5 in shots 12, simultaneous fixation of the housing portion 11 and the base plate 4 to one another Thus the otherwise time-consuming assembly is accomplished with one rotary motion.

We claim:

1. An encoder, comprising a housing having a first housing portion and a separate second housing portion, one of said housing portions being receivable in the other of said housing portions, and said first and second housing portions respectively being provided with first and second coupling means for connecting said first and second housing portions to one another, one of said coupling means including at least one cutout, and the other of said coupling means including at least one projection receivable in said one cutout, said housing having an arcuate cross section, and said one projection and one cutout curving in circumferential direction of said housing, said first and second housing portions also respectively being provided with first and second guide means for adjusting said first and second housing portions relative to one another, and said first housing portion having a first outer periphery, said second housing portion having a second outer periphery, and one of said guide means including at least one guide surface in the region of the respective outer periphery; a sensor receivable in said housing; a circuit board receivable in said housing; at least one encoding component receivable in said housing and including a codewheel, said housing being provided with a bearing section which is arranged to engage said one component during assembly of said encoder; and a motor with a drive shaft, said motor having an end face, and said drive shaft including a shaft section which projects beyond said end face, said housing being connectible to said end face, and said shaft section being receivable in said housing when said housing is connected to said end face, said drive shaft having a first axis of rotation, and said one component having a second axis of rotation which is arranged to be in substantial register with said first axis, said bearing section including a substantially annular bearing surface having a third axis which is arranged to be in substantial register with said first and second axes.

2. The encoder of claim 1, wherein said bearing section comprises a thrust collar.

3. The encoder of claim 1, wherein said one guide surface and said one projection are integral.

4. The encoder of claim 1, wherein said one component is provided with a guide passage for said drive shaft.

5. The encoder of claim 4, wherein said one component comprises a hub fast with said codewheel, said codewheel having a side which is arranged to face said bearing section, and said hub having a rim which projects beyond said side and is engageable by said bearing section.

6. The encoder of claim 4, wherein said one component has an end surface arranged to face said motor, said guide passage including a positioning section between said end surface and a predetermined location of said one component, and said positioning section widening in a direction from said predetermined location towards said end surface.

7. The encoder of claim 1, wherein said first and second housing portions are provided with cooperating protrusions and depressions for positioning said first and second housing portions relative to one another.

8. The encoder of claim 7, wherein said protrusions and depressions are sawtooth-shaped.

9. The encoder of claim 1, wherein said one projection and said one cutout have respective tapering sections designed to cause relative shifting of said first and second housing portions in a sense separating the same as said first and second housing portions are rotated with respect to one another while said one projection is received in said one cutout.

10. The encoder of claim 9, wherein said one projection has another section which is fast with the respective tapering section, said other section being of substantially constant area.

11. The encoder of claim 9, wherein the tapering section of said one cutout is longer than the tapering section of said one projection.

12. The encoder of claim 1, further comprising a retaining ring for holding said one component in said housing.

13. The encoder of claim 12, wherein said retaining ring is arranged to hold said one component in said housing with play.

14. The encoder of claim 12, wherein said retaining ring is provided with extensions for engagement by said housing.

15. The encoder of claim 12, wherein said retaining ring has a central opening and said one component comprises a hub receivable in said central opening.

16. The encoder of claim 15, wherein said hub fits in said central opening with clearance.

* * * * *